United States Patent
Cha et al.

(10) Patent No.: US 9,420,337 B2
(45) Date of Patent: Aug. 16, 2016

(54) METHOD AND DEVICE FOR TRANSMITTING AND RECEIVING VIDEO STREAM

(75) Inventors: Sung-Wook Cha, Seoul (KR); Ji-Sung Oh, Seongnam-si (KR); Jun-Yeub Lee, Seongnam-si (KR); Seung-Hwan Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 464 days.

(21) Appl. No.: 13/155,135

(22) Filed: Jun. 7, 2011

(65) Prior Publication Data
US 2012/0102534 A1    Apr. 26, 2012

(30) Foreign Application Priority Data
Oct. 26, 2010  (KR) .................. 10-2010-0104749

(51) Int. Cl.
*H04N 7/173* (2011.01)
*H04N 21/442* (2011.01)
*G06F 3/14* (2006.01)

(52) U.S. Cl.
CPC ........ *H04N 21/44231* (2013.01); *G06F 3/1454* (2013.01); *G09G 2370/04* (2013.01); *G09G 2370/14* (2013.01); *G09G 2370/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,966,120 A * | 10/1999 | Arazi et al. | .................. | 715/724 |
| 6,240,555 B1 * | 5/2001 | Shoff et al. | .................. | 725/110 |
| 6,801,575 B1 * | 10/2004 | Crinon | .................. | 375/240.26 |
| 2002/0162121 A1 * | 10/2002 | Mitchell | .................. | 725/135 |
| 2005/0060739 A1 * | 3/2005 | Verna | .................. | 725/19 |
| 2006/0242153 A1 * | 10/2006 | Newberry et al. | .................. | 707/10 |
| 2010/0071011 A1 * | 3/2010 | Addair et al. | .................. | 725/107 |

* cited by examiner

*Primary Examiner* — Chenea Smith
(74) *Attorney, Agent, or Firm* — Sughrue Mion, PLLC

(57) ABSTRACT

A method and device for transmitting and receiving a video stream are provided. The transmitting method includes receiving auxiliary information and one or more video streams, and distributing them as one or more pieces of lane data; transmitting the lane data to a receiving device; and receiving a result value that indicates whether a video processing unit for processing one of the one or more video streams works normally. The receiving method includes receiving one or more pieces of lane data that include auxiliary information and one or more video streams; merging the lane data into one or more video streams; selecting a video processing unit based on the auxiliary information, where one or more video processing units process the video streams; generating a result value for the selected video processing unit that indicates whether the video processing unit works normally; and transmitting the result value to a transmitting device.

22 Claims, 4 Drawing Sheets

METHOD AND DEVICE FOR TRANSMITTING AND RECEIVING VIDEO STREAM

CROSS-REFERENCE TO RELATED PATENT APPLICATION

This application claims priority from Korean Patent Application No. 10-2010-0104749, filed on Oct. 26, 2010, in the Korean Intellectual Property Office, the disclosure of which is incorporated by reference herein in its entirety.

BACKGROUND

1. Field

Apparatuses, devices and methods consistent with exemplary embodiments relate to transmitting and receiving a video stream at a high speed in a wired or wireless manner, and more particularly, to transmitting and receiving a video stream in a wired or wireless manner using forward and backward channels.

2. Description of the Related Art

According to the related art, high-speed video stream transmission is performed by using Low-Voltage Differential Signaling (LVDS). The LVDS indicates a high-speed digital interface having characteristics such as low power consumption and high noise rejection for a fast data transmission speed. Since the LVDS is standardized by the ANSI/TIA/EIA-644 standard, the LVDS is widely used in various applications. Transmission using the LVDS is performed by using N data transmission channels and a clock channel.

In addition, according to the related art, video stream transmission is uni-directionally performed from a transmitting device to a receiving device. The transmitting device does not receive feedback indicating whether the receiving device has correctly received the video stream. Thus, when an error occurs in a video stream due to a malfunction in the receiving device, there is no way for the transmitting device to rectify the error.

SUMMARY

One or more exemplary embodiments provide a method and device for wiredly or wirelessly transmitting and receiving a video stream at a high speed, in which a transmitting device transmits a high-speed video stream to a receiving device by using a forward channel, and the transmitting device receives a result value, which indicates whether a specific video processing unit normally works, from the receiving device via a backward channel, whereby the transmitting device may determine whether the specific video processing unit in the receiving device normally works.

One or more exemplary embodiments also provide a computer-readable recording medium having recorded thereon a program for executing the method.

According to an aspect of an exemplary embodiment, there is provided a method of transmitting a video stream, the method including receiving auxiliary information and one or more video streams, and distributing the auxiliary information and the one or more video streams as one or more pieces of lane data; transmitting the one or more pieces of lane data to a receiving device; and receiving a result value from the receiving device that indicates whether a video processing unit from among one or more video processing units for respectively processing the one or more video streams works normally.

The method may further include one or more lanes through which the one or more pieces of lane data are respectively transmitted, and the one or more lanes may comprise a forward channel.

The result value may be received from the receiving device through a backward channel, and the backward channel may include one or more lanes.

The auxiliary information may include an identifier (ID) and a mode selection value with respect to a video processing unit to be selected from among the one or more video processing units; and the mode selection value may identify a manner by which the result value for indicating whether the video processing unit works normally is generated.

The mode selection value may identify a sampling value generation manner or a cyclic redundancy check (CRC) value generation manner, and when the mode selection value identifies the sampling value generation manner, the auxiliary information may further include a sampling period value.

The method may further include the operation of determining whether the video processing unit works normally based on the result value.

According to an aspect another exemplary embodiment, there is provided a method of receiving a video stream, the method including receiving one or more pieces of lane data comprising auxiliary information and one or more video streams, respectively; merging the one or more pieces of lane data into one or more video streams; selecting a video processing unit from among one or more video processing units, based on the auxiliary information, the one or more video processing units processing the one or more video streams, respectively; generating a result value for the selected video processing unit that indicates whether the video processing unit works normally; and transmitting the result value to a transmitting device.

The method may further comprises one or more lanes through which the one or more pieces of lane data are respectively received, and the one or more lanes may comprise a forward channel.

The result value may be transmitted to the transmitting device through a backward channel; and the backward channel may include one or more lanes.

The auxiliary information may include an identifier (ID) and a mode selection value with respect to a video processing unit to be selected from among the one or more video processing units; and the mode selection value may identify a manner by which the result value for indicating whether the video processing unit works normally is generated.

The mode selection value may identify a sampling value generation manner or a cyclic redundancy check (CRC) value generation manner, and when the mode selection value identifies the sampling value generation manner, the auxiliary information may further include a sampling period value.

The result value may be generated by sampling each of the one or more video streams according to a period based on the sampling period value; or by generating a CRC value with respect to each of the one or more video streams, according to the mode selection value.

According to another aspect an exemplary embodiment, there is provided a computer-readable recording medium having recorded thereon a program for executing the method.

According to an aspect of another exemplary embodiment, there is provided a transmitting device including a distribution unit that receives auxiliary information and one or more video streams, and distributes the auxiliary information and the one or more video streams as one or more pieces of lane data; a plurality of post-processing units that transmit the one or more pieces of lane data to a receiving device; and a pre-processing unit that receives a result value from the receiving device that indicates whether a video processing unit from among one or more video processing units for respectively processing the one or more video streams works normally.

According to an aspect of another exemplary embodiment, there is provided a receiving device including a plurality of pre-processing units that receive one or more pieces of lane data comprising auxiliary information and one or more video streams, respectively; a merging unit that merges the one or more pieces of lane data into one or more video streams; one or more video processing unit selection units that select a video processing unit from among one or more video processing units, based on the auxiliary information, the one or more video processing units processing the one or more video streams, respectively; a result value generation unit that generates a result value that indicates whether the selected video processing unit works normally; and a post-processing unit that transmits the result value to a transmitting device.

BRIEF DESCRIPTION OF THE DRAWINGS

The above and/or other aspects will become more apparent by describing in detail exemplary embodiments with reference to the attached drawings in which.

DETAILED DESCRIPTION

Figure 1:
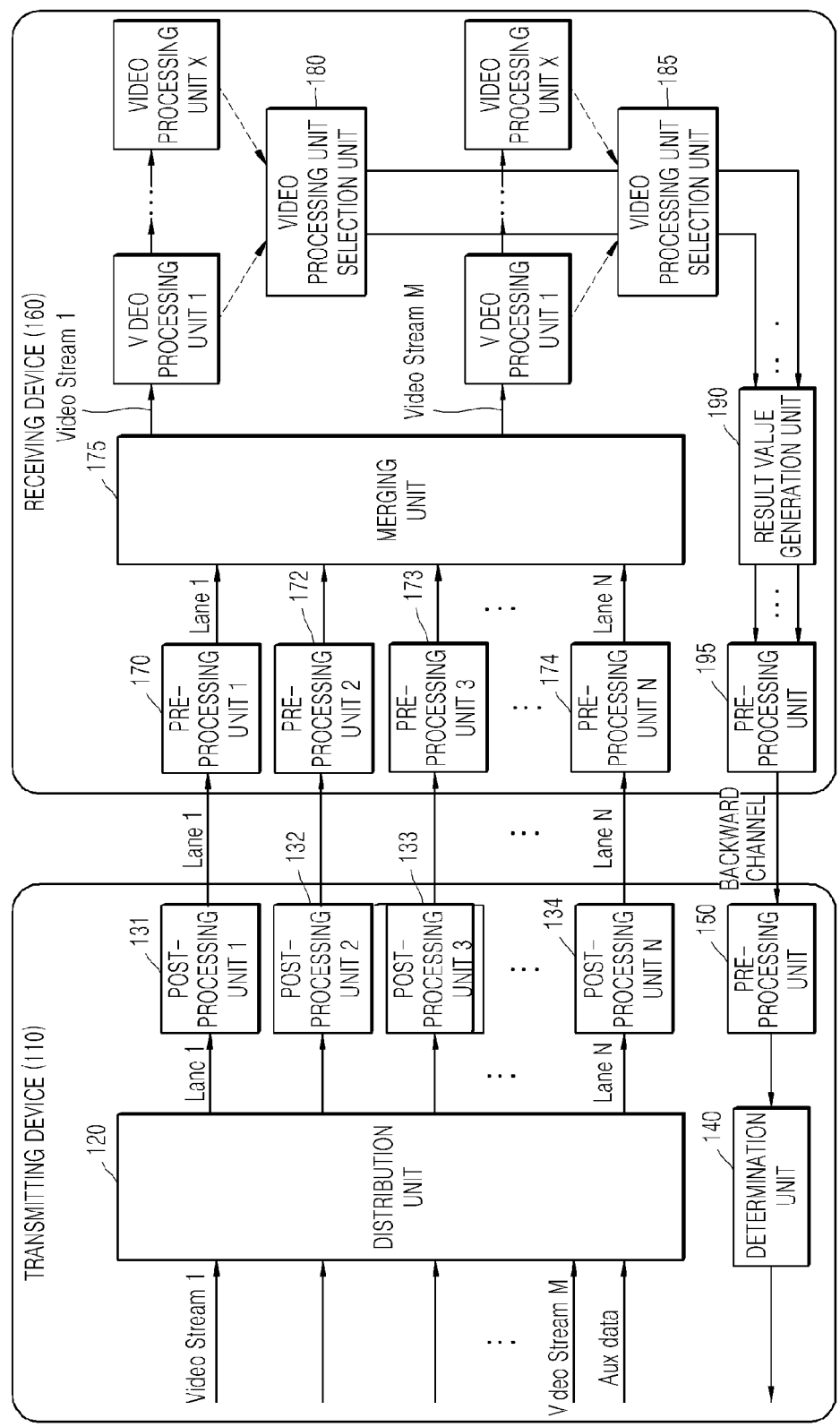
FIG. 1 is a diagram of a transmitting device and a receiving device according to an exemplary embodiment.

Hereinafter, exemplary embodiments will be described in detail with reference to the attached drawings. In the drawings, like reference numerals in the drawings denote like elements, and the size of each component may be exaggerated for clarity.

FIG. 1 is a diagram of a transmitting device 110 and a receiving device 160 according to an exemplary embodiment.

The transmitting device 110 includes a distribution unit 120, post-processing units 131 through 134, a pre-processing unit 150, and a determination unit 140. The number of post-processing units is not limited, and post-processing unit 1 (131), post-processing unit 2 (132), post-processing unit 3 (133) and post-processing unit N (134) are shown and individually numbered only for clarity of description.

The distribution unit 120 receives one or more video streams and auxiliary information, and distributes the one or more video streams and auxiliary information as one or more pieces of lane data (Lane 1 to Lane N).

For example, the distribution unit 120 may receive M video streams (e.g., pixel data) and may distribute the M video streams to 3k (where, k=1, 2, 3, . . . ) lanes which are previously determined.

Each of the post-processing units 131 through 134 transmits each of the one or more pieces of lane data to the receiving device 160. One or more lanes through which the one or more pieces of lane data are respectively transmitted are included in a forward channel, and each lane data corresponds to each of the post-processing units 131 through 134 in a one-to-one manner.

In forward transmission, the post-processing units 131 through 134 may increase a data transmission rate by using pulse-amplitude modulation (PAM)-4 modulation, without an electromagnetic interference (EMI) increase. However, alternatively, another modulation other than the PAM-4 modulation may also be used.

Before transmitting each lane data to the receiving device 160, the post-processing units 131 through 134 may perform scrambling, encoding, and serializing operations. Detailed descriptions regarding the scrambling, encoding, and serializing operations are omitted here.

The post-processing units 131 through 134 transmit the auxiliary information by using a temporal interval that does not have a video stream.

For example, each of the post-processing units 131 through 134 may transmit each lane data to the receiving device 160 via each of 3k (where, k=1, 2, 3, . . . ) lanes which are previously determined.

The auxiliary information includes an identifier (ID) and a mode selection value with respect to a predetermined video processing unit from among one or more video processing units. The mode selection value identifies a manner by which a result value for indicating whether the predetermined video processing unit normally works is generated. For example, the mode selection value may identify a sampling value generation manner or a cyclic redundancy check (CRC) value generation manner. If the mode selection value identifies the sampling value generation manner, the auxiliary information further includes a sampling period value.

A CRC is performed to determine a check value indicating whether data has an error when the data is transmitted via a network, and a detailed description thereof is omitted here.

The pre-processing unit 150 receives a result value from the receiving device 160, wherein the result value indicates whether a predetermined video processing unit from among respective video processing units for processing respective video streams works normally.

The predetermined video processing unit denotes a video processing unit that is identified by the ID that is included in the auxiliary information and transmitted by the transmitting device 110 and that is a predetermined video processing unit from among the video processing units.

The pre-processing unit 150 receives a result value from the receiving device 160 via a backward channel, wherein the result value indicates whether the predetermined video processing unit works normally.

The forward channel transmits a video stream, so it is advantageous for the forward channel to have a high data transmission rate. However, the backward channel transmits information about an operational error in a selected video processing unit, so that the backward channel may have a lower data transmission rate than that of the forward channel.

The backward channel may be used in a process in which a link is initialized by exchanging a previously agreed pattern between the transmitting device 110 and the receiving device 160. In the process, the receiving device 160 may transmit the agreed pattern to the transmitting device 110 via the backward channel so as to correctly set clock synchronization and link frame timing synchronization.

The result value denotes a value that is generated by using a result value generation manner identified by the mode selection value that is included in the auxiliary information and transmitted by the transmitting device 110.

When the mode selection value identifies the sampling value generation manner, the result value denotes a value generated by sampling a video stream according to a period based on a sampling period value. The sampling period value is included in the auxiliary information and transmitted by the transmitting device 110.

When the mode selection value identifies the CRC value generation manner, the result value denotes a CRC value generated by performing a CRC algorithm.

The determination unit 140 determines whether the predetermined video processing unit works normally, according to the result value indicating whether the predetermined video processing unit works normally.

When the mode selection value identifies the sampling value generation manner, the determination unit 140 generates a CRC value by using the sampling value and then stores the CRC value in an internal memory.

When the mode selection value identifies the CRC value generation manner, the determination unit 140 does not additionally calculate a CRC value, and stores the CRC value in the internal memory.

The determination unit 140 determines whether the stored CRC value is equivalent to a CRC value corresponding to a video stream of a video frame that is received after the stored CRC value, so that the determination unit 140 may check whether a predetermined video processing unit for processing the video stream works normally.

The receiving device 160 includes pre-processing units 171 through 174, a merging unit 175, one or more video processing units (video processing unit 1 to video processing unit x) for each video stream (video stream 1 to video stream M), one or more video processing unit selection units (video processing unit selection unit 180 to video processing unit selection unit 185), a result value generation unit 190, and a post-processing unit 195.

The pre-processing units 171 through 174 receive one or more pieces of lane data including one or more video streams and auxiliary information, respectively. The number of pre-processing units is not limited, and pre-processing unit 1 (171), pre-processing unit 2 (172), pre-processing unit 3 (173) and pre-processing unit N (174) are shown and individually numbered only for clarity of description. One or more lanes through which the one or more pieces of lane data are received are included in a forward channel. The one or more lanes correspond to the pre-processing units 171 through 174, respectively.

The merging unit 175 merges the one or more pieces of lane data into one or more video streams.

Each of the video processing units receives the merged video stream, performs a series of processes on the merged video stream, and then outputs the video stream. The series of processes may vary according to each of the video processing units, and may include improvement of image quality, color compensation, contrast control, or the like.

Each of the video processing unit selection units (video processing unit selection unit 180 to video processing unit selection unit 185) selects a result of a predetermined video processing unit that is selected from among one or more video processing units and that is selected based on the auxiliary information.

The predetermined video processing unit denotes a video processing unit that is identified by an ID that is included in the auxiliary information and that is a predetermined video processing unit from among the one or more video processing units.

The result value generation unit 190 receives the result of the predetermined video processing unit with respect to a video stream from among the one or more video streams, and then generates a result value for indicating whether the predetermined video processing unit works normally. The result value means a value that is generated by using a result value generation manner identified by a mode selection value that is included in the auxiliary information and transmitted by the transmitting device 110.

The post-processing unit 195 transmits the result value to the transmitting device 110. The post-processing unit 195 transmits the result value to the transmitting device 110 via a backward channel. The backward channel may include one or more lanes.

According to the present exemplary embodiment, the transmitting device 110 may transmit the one or more video streams and may determine whether each of the video processing units in the receiving device 160 works normally, so that the transmitting device 110 may detect a reason that causes an error in the receiving device 160.

In addition, according to the present exemplary embodiment, the transmitting device 110 may identify the predetermined video processing unit in the receiving device 160, wherein the transmitting device 110 attempts to determine whether the predetermined video processing unit works normally, and may select the manner by which the result value for indicating whether the predetermined video processing unit works normally is generated.

Figure 2:
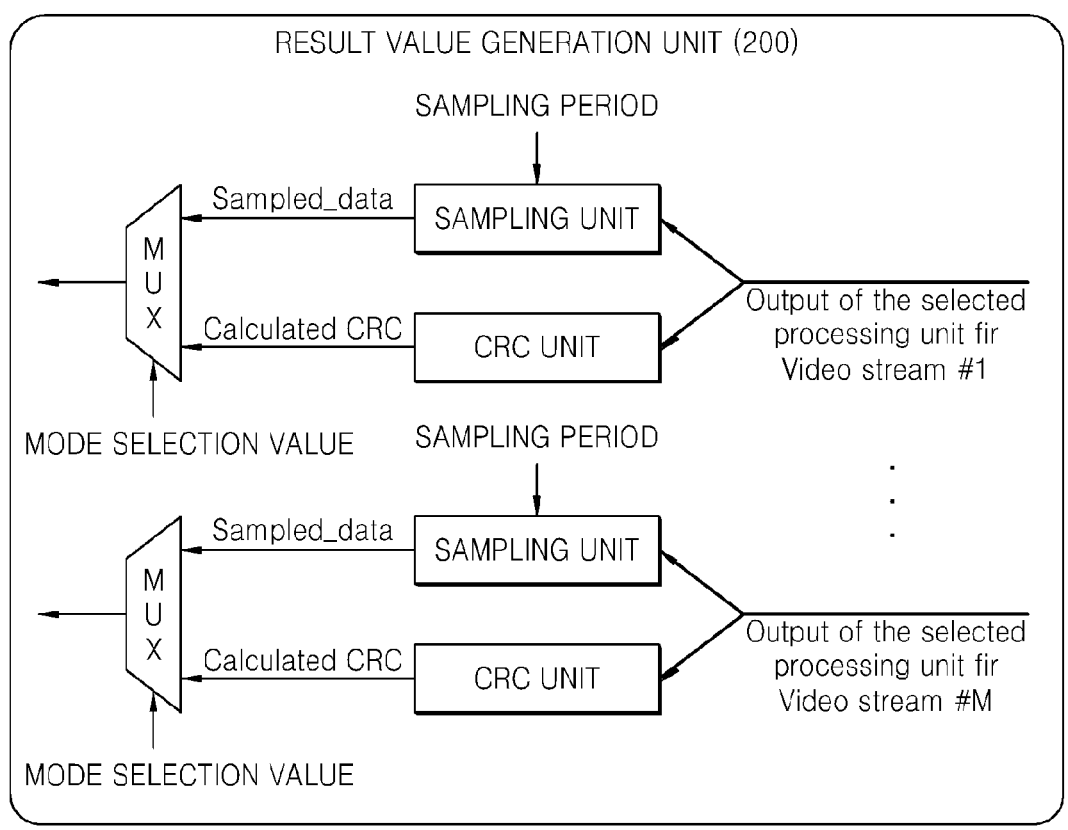
FIG. 2 is a diagram of a result value generation unit according to another exemplary embodiment.

FIG. 2 is a diagram of a result value generation unit 200 according to another exemplary embodiment.

The result value generation unit 200 receives a result of a predetermined video processing unit with respect to a video stream from among one or more video streams, and then generates a result value for indicating whether the predetermined video processing unit works normally. The result value denotes a value that is generated by using a result value generation manner identified by a mode selection value that is included in the auxiliary information and transmitted by the transmitting device 110 (refer to FIG. 1). For example, the mode selection value identifies a sampling value generation manner or a CRC value generation manner.

The result value generation unit 200 may include one or more sampling units 202, 204 and one or more CRC units 212, 214. The result value generation unit 200 may also include one or more multiplexers 222, 224.

When the mode selection value received from the transmitting device 110 identifies the sampling value generation manner, each of the one or more sampling units 202, 204 generates a result value by sampling a corresponding respective video stream according to a period based on a sampling period value. The sampling period value is included in the auxiliary information and transmitted by the transmitting device 110.

When the mode selection value received from the transmitting device 110 identifies the CRC value generation manner, each of the one or more CRC units 212, 214 generates a CRC value with respect to a corresponding respective video stream by performing a CRC algorithm.

An exemplary scenario according to an exemplary embodiment will now be provided.

In order to perform an error check on the receiving device 160 (refer to FIG. 1), the transmitting device 110 transmits a specific still image and auxiliary information to the receiving device 160. With respect to the still image, 240 frames are transmitted per each second, and 1 frame is formed of 4 streams. The auxiliary information includes a mode selection value and selectively includes a sampling period value.

After the receiving device 160 receives four streams forming one frame, according to the mode selection value included in the auxiliary information, the receiving device 160 performs sampling on each of four outputs from selected video processing units by using the sampling period value and then transmits a result value to the transmitting device 110 via a backward channel, or the receiving device 160 transmits a CRC value to the transmitting device 110 via the backward channel. The CRC value is generated once per each frame.

The auxiliary information received from the transmitting device 110 includes the mode selection value that identifies a sampling value generation manner or a CRC value generation manner.

When the sampling value generation manner is selected by the mode selection value, the receiving device 160 performs sampling on a video stream according to a period based on the sampling period value.

When the CRC value generation manner is selected by the mode selection value, the receiving device 160 calculates a CRC value for each of video streams. In consideration of the fact that one stream (a pixel stream) is formed of R/G/B, 48 (16×3) bits of the CRC value may be obtained from one video stream.

The transmitting device 110 receives the sampling value or the CRC value from the receiving device 160 via the backward channel. When the transmitting device 110 receives the sampling value, the transmitting device 110 calculates a CRC value by using the sampling value and then stores a calculation result in an internal memory. The transmitting device 110 stores a CRC value for each frame.

When the transmitting device 110 receives the CRC value from the receiving device 160, the transmitting device 110 does not additionally calculate a CRC value and stores the CRC value in the internal memory.

The transmitting device 110 determines whether subsequent CRC values that are received later via the backward channel have the same value, so that the transmitting device 110 determines whether a specific video processing unit has an error. In this scenario, the transmitting device 110 may determine whether 192 (48×4 frames) bits of CRC values for frames that are temporally subsequent have the same value.

Figure 3:
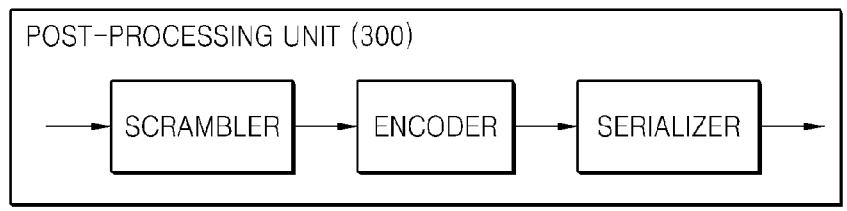
FIG. 3 is a diagram of a post-processing unit according to another exemplary embodiment.

FIG. 3 is a diagram of a post-processing unit 300 according to another exemplary embodiment.

The post-processing unit 300 includes a scrambler 310, an encoder 320, and a serializer 330.

The post-processing unit 300 transmits each of one or more pieces of lane data to a receiving device.

The scrambler 310 scrambles the signal for each lane data according to a regular rule so as to prevent illegal copying or viewing, etc. of a video stream.

The encoder 320 encodes the signal for each lane data.

The serializer 330 transforms the signal for each lane data into a series of bit-streams, and transmits the bit-streams via a network.

Figure 4:
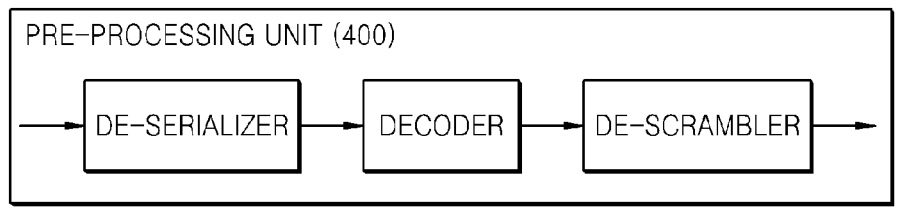
FIG. 4 is a diagram of a pre-processing unit according to another exemplary embodiment.

FIG. 4 is a diagram of a pre-processing unit 400 according to another exemplary embodiment.

The pre-processing unit 400 includes a de-serializer 410, a decoder 420, and a de-scrambler 430.

The pre-processing unit 400 receives one or more pieces of lane data from the transmitting device 110 (refer to FIG. 1), wherein the one or more pieces of lane data include one or more video streams and auxiliary information.

The de-serializer 410 transforms a series of bit-streams, which are received via a network, into a signal for each lane data.

The decoder 420 decodes the signal for each lane data.

The de-scrambler 430 obtains original lane data from each of one or more pieces of lane data scrambled according to a regular rule.

Figure 5:
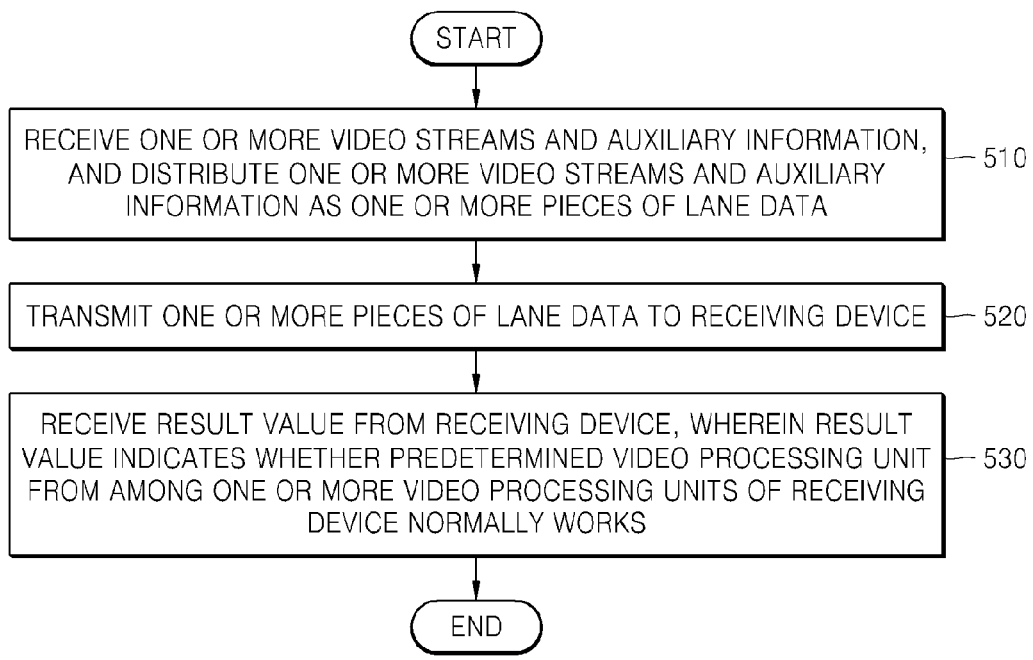
FIG. 5 is a flowchart for describing a video stream transmitting procedure, according to an exemplary embodiment.

FIG. 5 is a flowchart for describing a video stream transmitting procedure according to an exemplary embodiment.

In operation 510, the transmitting device 110 receives one or more video streams and auxiliary information, and distributes the one or more video streams and the auxiliary information as one or more pieces of lane data.

The auxiliary information includes an ID and a mode selection value with respect to a predetermined video processing unit from among one or more video processing units. The mode selection value identifies a manner by which a result value for indicating whether the predetermined video processing unit works normally is generated. The mode selection value may identify a sampling value generation manner or a CRC value generation manner. If the mode selection value identifies the sampling value generation manner, the auxiliary information further includes a sampling period value.

In operation 520, the transmitting device 110 transmits one or more pieces of lane data to a receiving device. One or more lanes via which the one or more pieces of lane data are respectively transmitted are included in a forward channel.

In operation 530, the transmitting device 110 receives a result value from the receiving device, wherein the result value indicates whether a predetermined video processing unit from among respective video processing units for processing respective video streams works normally.

The transmitting device 110 receives a result value from the receiving device via a backward channel, wherein the result value indicates whether the predetermined video processing unit works normally. The backward channel includes one or more lanes.

Afterward, the transmitting device 110 determines whether the predetermined video processing unit works normally according to the result value indicating whether the predetermined video processing unit works normally.

Figure 6:
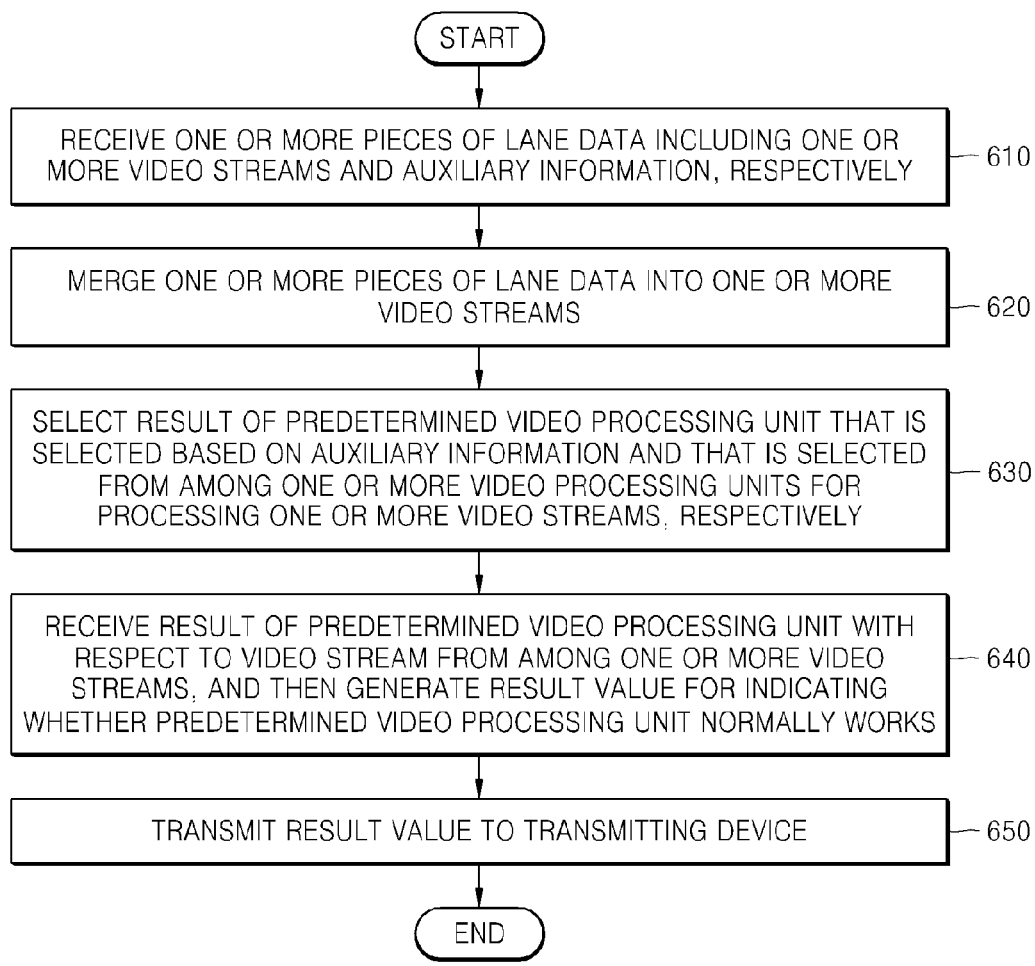
FIG. 6 is a flowchart for describing a video stream receiving procedure, according to another exemplary embodiment.

FIG. 6 is a flowchart for describing a video stream receiving procedure according to another exemplary embodiment.

In operation 610, the receiving device 160 receives one or more pieces of lane data including one or more video streams and auxiliary information, respectively. One or more lanes via which the one or more pieces of lane data are received are included in a forward channel.

The auxiliary information includes an ID and a mode selection value with respect to a predetermined video processing unit from among one or more video processing units. The mode selection value identifies a manner by which a result value for indicating whether the predetermined video processing unit works normally is generated. The mode selection value may identify a sampling value generation manner or a CRC value generation manner. If the mode selection value identifies the sampling value generation manner, the auxiliary information further includes a sampling period value.

In operation 620, the receiving device 160 merges the one or more pieces of lane data into one or more video streams.

In operation 630, the receiving device 160 selects a result of a predetermined video processing unit that is selected based on the auxiliary information and that is selected from among the one or more video processing units for processing the one or more video streams, respectively.

In operation 640, the receiving device 160 receives the result of the predetermined video processing unit with respect to a video stream from among the one or more video streams, and then generates a result value for indicating whether the predetermined video processing unit works normally.

According to the mode selection value, the receiving device 160 generates a result value by sampling each video stream according to a period based on the sampling period value, or generates a CRC value with respect to each video stream.

In operation 650, the receiving device 160 transmits the generated result value to a transmitting device.

The receiving device 160 transmits the generated result value to the transmitting device via the backward channel. The backward channel includes one or more lanes.

According to the one or more exemplary embodiments, the transmitting device and the receiving device may include a bus coupled to each unit of the devices illustrated in FIG. 1, at least one processor (central processing unit) coupled to the bus, and a memory coupled to the at least one processor that is combined with the bus so as to store commands, receive messages, and generate messages, and to execute the commands.

The present inventive concept can also be embodied as computer readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer readable code is stored and executed in a distributed fashion.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method of transmitting a video stream, the method comprising:
   dividing one or more video streams into a plurality of pieces of data;
   transmitting, by the device, the plurality of pieces of data and auxiliary information to a receiving device over a plurality of lanes; and
   receiving, by the device, a result value from the receiving device that indicates whether any-video processing unit from among one or more video processing units for respectively processing the one or more video streams is in a normal working state,
   wherein the auxiliary information comprises an identifier (ID) with respect to a video processing unit to be selected from among the one or more video processing units and a mode selection value which identifies a manner by which the result value for indicating whether the video processing unit is in the normal working state is generated.

2. The method of claim 1, further comprising one or more lanes through which the plurality of pieces of data are respectively transmitted,
   wherein the one or more lanes comprise a forward channel.

3. The method of claim 1, wherein the result value is received from the receiving device through a backward channel; and
   the backward channel comprises one or more lanes.

4. The method of claim 1, wherein the mode selection value identifies a sampling value generation manner or a cyclic redundancy check (CRC) value generation manner, and
   when the mode selection value identifies the sampling value generation manner, the auxiliary information further comprises a sampling period value.

5. The method of claim 1, further comprising determining whether the video processing unit is in a normal working state based on the result value.

6. A method of receiving one or more video streams, the method comprising:
   receiving, from a transmitting device over a plurality of lanes, auxiliary information and one or more pieces of lane data, respectively;
   merging the one or more pieces of data into the one or more video streams;
   selecting a video processing unit from among one or more video processing units, based on the auxiliary information, the one or more video processing units processing the one or more video streams, respectively;
   generating a result value for the video processing unit that indicates whether the video processing unit is in a normal working state; and
   transmitting the result value to the transmitting device,
   wherein the auxiliary information comprises an identifier (ID) with respect to the video processing unit to be selected from among the one or more video processing units and a mode selection value which identifies a manner by which the result value for indicating whether the video processing unit is in the normal working state is generated.

7. The method of claim 6, further comprising one or more lanes through which the one or more pieces of data are respectively received,
   wherein the one or more lanes comprise a forward channel.

8. The method of claim 6, wherein the result value is transmitted to the transmitting device through a backward channel; and
   the backward channel comprises one or more lanes.

9. The method of claim 6, wherein the mode selection value identifies a sampling value generation manner or a cyclic redundancy check (CRC) value generation manner, and
   when the mode selection value identifies the sampling value generation manner, the auxiliary information further comprises a sampling period value.

10. The method of claim 9, wherein the result value is generated by sampling each of the video stream according to a period based on the sampling period value, or by generating a CRC value with respect to each of the video stream, according to the mode selection value.

11. A transmitting device comprising:
    a distributor that divides one or more video streams into one or more pieces of data;
    a plurality of post-processors that transmit the one or more pieces of data and auxiliary information to a receiving device; and
    a pre-processor that receives a result value from the receiving device that indicates whether any video processor from among one or more video processors for respectively processing the one or more video streams is in a normal working state,
    wherein the auxiliary information comprises an identifier (ID) with respect to the video processor to be selected from among the one or more video processors and a mode selection value which identifies a manner by which the result value for indicating whether the video processor is in the normal working state is generated.

12. The transmitting device of claim 11, further comprising one or more lanes through which the one or more pieces of data are respectively transmitted;
    the one or more lanes comprise a forward channel; and
    wherein the one or more lanes correspond to the plurality of post-processors, respectively.

13. The transmitting device of claim 11, wherein the result value is received from the receiving device via a backward channel, and
the backward channel comprises one or more lanes.

14. The transmitting device of claim 11, wherein the mode selection value identifies a sampling value generation manner or a cyclic redundancy check (CRC) value generation manner, and
when the mode selection value identifies the sampling value generation manner, the auxiliary information further comprises a sampling period value.

15. The transmitting device of claim 11, further comprising a determiner that determines whether the video processor works normally based on the result value.

16. A receiving device comprising:
a plurality of pre-processors that receive, from a transmitting device one or more pieces of data and auxiliary information;
a merger that merges the one or more pieces of data into one or more video streams;
one or more video processor selection units that select a video processor from among one or more video processors, based on the auxiliary information, the one or more video processors processing the one or more video streams, respectively;
a result value generator that generates a result value that indicates whether the video processor is in a normal working state; and
a post-processor that transmits the result value to the transmitting device,
wherein the auxiliary information comprises an identifier (ID) with respect to the video processor to be selected from among the one or more video processors and a mode selection value which identifies a manner by which the result value for indicating whether the video processor is in the normal working state is generated.

17. The receiving device of claim 16, further comprising one or more lanes through which the one or more pieces of data are respectively received;
wherein the one or more lanes comprise a forward channel; and
the one or more lanes correspond to the plurality of pre-processors, respectively.

18. The receiving device of claim 16, wherein the post-processor transmits the result value to the transmitting device via a backward channel; and
the backward channel comprises one or more lanes.

19. The receiving device of claim 16, wherein the mode selection value identifies a sampling value generation manner or a cyclic redundancy check (CRC) value generation manner, and
when the mode selection value identifies the sampling value generation manner, the auxiliary information further comprises a sampling period value.

20. The receiving device of claim 16, wherein the result value generator comprises:
a sampler that generates a result value by sampling each of the one or more video streams according to a period based on the sampling period value; and
a cyclic redundancy checker (CRC) that generates a CRC value with respect to each of the one or more video streams.

21. A non-transitory computer-readable recording medium having recorded thereon a program for executing a method comprising:
dividing one or more video streams into a plurality of pieces of data;
transmitting, by the device, the plurality of pieces of data and auxiliary information to a receiving device over a plurality of lanes; and
receiving, by the device, a result value from the receiving device that indicates whether any video processing unit from among one or more video processing units for respectively processing the one or more video streams is in a normal working state,
wherein the auxiliary information comprises an identifier (ID) with respect to a video processing unit to be selected from among the one or more video processing units and a mode selection value which identifies a manner by which the result value for indicating whether the video processing unit is in the normal working state is generated.

22. A non-transitory computer-readable recording medium having recorded thereon a program for executing a method comprising:
receiving, from a transmitting device over a plurality of lanes, auxiliary information and one or more pieces of data;
merging the one or more pieces of data into one or more video streams;
selecting a video processing unit from among one or more video processing units, based on the auxiliary information, the one or more video processing units for processing the one or more video streams, respectively;
generating a result value for the video processing unit that indicates whether the video processing unit is in a normal working state; and
transmitting the result value to the transmitting device,
wherein the auxiliary information comprises an identifier (ID) with respect to the video processing unit to be selected from among the one or more video processing units and a mode selection value which identifies a manner by which the result value for indicating whether the video processing unit is in the normal working state is generated.

* * * * *